United States Patent
Han et al.

(10) Patent No.: US 9,108,488 B2
(45) Date of Patent: Aug. 18, 2015

(54) DOOR FOR AIR CONDITIONER OF VEHICLES

(75) Inventors: Seongseok Han, Daejeon-si (KR); Sangkyu Park, Daejeon-si (KR); Jaekyung Jung, Daejeon-si (KR)

(73) Assignee: Halla Visteon Climate Control Corporation, Daejeon (KR)

( * ) Notice: Subject to any disclaimer, the term of this patent is extended or adjusted under 35 U.S.C. 154(b) by 1362 days.

(21) Appl. No.: 12/593,427

(22) PCT Filed: May 19, 2008

(86) PCT No.: PCT/KR2008/002786
§ 371 (c)(1),
(2), (4) Date: Sep. 28, 2009

(87) PCT Pub. No.: WO2008/147065
PCT Pub. Date: Dec. 4, 2008

(65) Prior Publication Data
US 2010/0144263 A1    Jun. 10, 2010

(30) Foreign Application Priority Data

| May 29, 2007 | (KR) | 10-2007-0052138 |
| Dec. 12, 2007 | (KR) | 10-2007-0129104 |
| Dec. 17, 2007 | (KR) | 10-2007-0132162 |
| Dec. 20, 2007 | (KR) | 10-2007-0133935 |

(51) Int. Cl.
*B60H 1/34* (2006.01)
*B60H 1/00* (2006.01)

(52) U.S. Cl.
CPC ...... *B60H 1/00678* (2013.01); *B60H 2001/007* (2013.01); *B60H 2001/00714* (2013.01)

(58) Field of Classification Search
CPC .............. B60H 1/00678; B60H 2001/007; B60H 2001/00714
USPC .................................................. 454/121
See application file for complete search history.

(56) References Cited

U.S. PATENT DOCUMENTS

| 4,452,301 A | * | 6/1984 | Last et al. | 165/42 |
| 4,498,528 A | * | 2/1985 | Jacquet | 165/42 |
| 5,159,954 A | * | 11/1992 | Janich | 137/557 |

(Continued)

FOREIGN PATENT DOCUMENTS

| CN | 2534054 Y | 2/2003 |
| JP | 63-301119 | 12/1988 |

(Continued)

OTHER PUBLICATIONS

Giordano F., et al. "Molecular Inclustion Complexes with β-Cyclodextrin", *J.Drug Dev.*, 4 (Suppl.1), (1991), pp. 13-15.

*Primary Examiner* — Steven B McAllister
*Assistant Examiner* — Jonathan Cotov
(74) *Attorney, Agent, or Firm* — Norton Rose Fulbright US LLP

(57) ABSTRACT

A door for an air conditioner in a vehicle, in which a thin sheet member is joined to a side of a mesh-type frame in such a way as to protrude more than an end portion of the frame so that the protruding portion of the thin sheet member is in contact with the air-conditioning case to thereby promote sealing of the door for opening and closing a passageway of an air-conditioning case, thereby preventing odors caused by molds and reducing material expenses and manufacturing costs by reducing weight of the door.

15 Claims, 14 Drawing Sheets

(56) References Cited

U.S. PATENT DOCUMENTS

| | | | |
|---|---|---|---|
| 5,775,407 A * | 7/1998 | Inoue | 165/42 |
| 5,899,262 A * | 5/1999 | Yamaguchi et al. | 165/42 |
| 6,193,600 B1 * | 2/2001 | Ito et al. | 454/69 |
| 6,382,518 B1 * | 5/2002 | Shibata et al. | 237/12.3 B |
| 6,540,604 B1 * | 4/2003 | Parekh et al. | 454/121 |
| 6,682,413 B1 * | 1/2004 | Hoffman et al. | 454/156 |
| 6,688,964 B2 * | 2/2004 | Uemura et al. | 454/121 |
| 7,520,803 B2 * | 4/2009 | Ito et al. | 454/121 |
| 2001/0008183 A1 * | 7/2001 | Ito et al. | 165/43 |
| 2001/0014582 A1 * | 8/2001 | Ito | 454/69 |
| 2003/0054751 A1 * | 3/2003 | Parekh et al. | 454/121 |
| 2009/0093207 A1 * | 4/2009 | Han et al. | 454/155 |

FOREIGN PATENT DOCUMENTS

| | | |
|---|---|---|
| JP | 63-301119 A | 12/1989 |
| JP | 10-236132 | 9/1998 |
| JP | 10 263132 A | 9/1998 |
| JP | 2000-125912 A | 5/2000 |
| JP | 2000-229513 | 8/2000 |
| JP | 2000-229513 A | 8/2000 |
| JP | 2006-007840 | 1/2006 |
| JP | 2006-7840 A | 1/2006 |
| KR | 20-1998-065937 U | 12/1998 |
| KR | 1998-065937 | 12/1998 |
| KR | 10-2004-0102529 A | 12/2004 |
| KR | 2004-0102529 | 12/2004 |
| KR | 1020060069989 A | 6/2006 |

\* cited by examiner

DOOR FOR AIR CONDITIONER OF VEHICLES

RELATED APPLICATIONS

This application is a §371 of PCT/KR2008/002786 filed May 19, 2008, which claims priority from Korean Patent Application No. KR-10-2007-0052138 filed May 29, 2007, KR-10-2007-0129104 filed Dec. 12, 2007, KR-10-2007-0132162 filed Dec. 17, 2007 and KR-10-2008-0133935 filed Dec. 20, 2007.

TECHNICAL FIELD

The present invention relates to a door for an air conditioner in a vehicle, and more particularly, to a door for an air conditioner in a vehicle, in which a thin sheet member is joined to a side of a mesh-type frame in such a way as to protrude more than an end portion of the frame so that the protruding portion of the thin sheet member is in contact with the air-conditioning case to thereby promote sealing of the door for opening and closing a passageway of an air-conditioning case, thereby preventing a bad smell caused by inhabitation of molds, and reducing material expenses and manufacturing costs by reducing weight of the door.

BACKGROUND ART

In general, an air conditioner for vehicles is a car interior component, which is installed in the vehicle heat for the purpose of cooling the inside of the vehicle in the summer season or the winter season or removing frost from a windshield in rainy season or winter season to thereby secure a driver's front and rear visual field. Since such an air conditioner typically includes a heating device and a cooling device together, so that it heats, cools or ventilates the inside of the vehicle through the steps of selectively introducing the indoor air or the outdoor air to the air conditioner through a blower unit, heating or cooling the introduced air, and blowing the heated or cooled air into the vehicle.

Such an air conditioner is classified into a three-piece type where a blower unit, an evaporator unit, and a heater core unit are disposed independently, a semi-center type where the evaporator unit and the heater core unit are embedded in an air-conditioning case and the blower unit is mounted separately, and a center-mounting type where the three units are all embedded in the air-conditioning case.

FIG. 1 illustrates the semi-center type air conditioner. In FIG. 1, the air conditioner 1 includes: an air-conditioning case 10 having an air inflow port 11 formed on an inlet thereof and a defrost vent 12a, a face vent 12b and floor vents 12c and 12d mounted on an outlet thereof in such a way as to be controlled in their opened amount by mode doors 16; a blower (not shown) connected to the air inflow port 11 of the air-conditioning case 10 for sending indoor air or outdoor air; an evaporator 2 and a heater core 3 embedded in the air-conditioning case 10; and a temperature-adjusting door 15 mounted between the evaporator 2 and the heater core 3 for adjusting opened amounts of a cold air flow passageway P1 bypassing the heater core 3 and a warm air channel flow P2 passing through the heater core 3.

Furthermore, the floor vents 12c and 12d are divided into a floor vent 12c for a front seat and a floor vent 12d for a rear seat.

Moreover, the temperature-adjusting door 15 and a mode door 16 respectively include rotary shafts 15b and 16b rotatably mounted on both side walls of the air-conditioning case 10 and plates 15a and 16a formed at one side of the rotary shafts 15b and 16b. In this instance, as the mode door 16, a center pivot door having the plates 16a formed at both sides of the rotary shaft 16b may be used.

The temperature-adjusting door 15 and the mode door 16 are connected to a cam (not shown) or a lever (not shown), which is actuated by an actuator (not shown) mounted on an outer surface of the air-conditioning case 10, and rotatably operated to thereby adjust the opened amounts of the cold and warm air flow passageways P1 and P2 or adjust an opened amount of passageways facing toward the vents 12a to 12d.

In addition, as shown in FIG. 2, the temperature-adjusting door 15 and the mode door 16 further include sealing members 15c and 16c attached to the edges of the plates 15a and 16a. The sealing members 15c and 16c are in close contact with a wall surface of the air-conditioning case 10 to improve sealability when the doors 15 and 16 close the corresponding passageways.

In the air conditioner 1 having the above structure, in case of the greatest cooling mode, the temperature-adjusting door 15 opens the cold air flow passageway P1 and closes the warm air flow passageway P2. Accordingly, the air blown by a blower (not shown) is converted into cold air by heat-exchanging with refrigerant flowing inside the evaporator 2 while passing through the evaporator 2, and then, flows toward a mixing chamber (MC) through the cold air flow passageway P1. After that, the converted air is discharged to the inside of a vehicle through the vents 12a to 12d opened according to a predetermined air-conditioning mode, whereby the inside of the vehicle is cooled.

Moreover, in case of the greatest heating mode, the temperature-adjusting door 15 closes the cold air flow passageway P1 and opens the warm air flow passageway P2. Accordingly, the air blown by a blower (not shown) passes through the evaporator 2, is converted into warm air by heat-exchanging with cooling water flowing inside the heater core 3 while passing through the heater core 3 through the warm air flow passageway P2, and then, flows toward the mixing chamber (MC). After that, the converted air is discharged to the inside of a vehicle through the vents 12a to 12d opened according to the predetermined air-conditioning mode, whereby the inside of the vehicle is heated.

In the meantime, in case of a half cooling mode, the temperature-adjusting door 15 is rotated to a neutral position, and opens the cold air flow passageway P1 and the warm air flow passageway P2 relative to the mixing chamber (MC). Accordingly, the cold air passing through the evaporator 2 and the warm air passing through the heater core 3 flow toward the mixing chamber (MC) and are mixed with each other, and then, are discharged to the inside of the vehicle through the vents 12a to 12d opened according to the predetermined air-conditioning mode.

The temperature-adjusting door 15 and the mode door 16 respectively have the sealing members 15c and 16c to increase sealability, but have a problem in that they generate a bad smell because of inhabitation of molds on the sealing members 15c and 16c.

Furthermore, since the sealing members 15c and 16c mounted on the temperature-adjusting door 15 and the mode door 16 are is very expensive and require much time to mount them to the temperature-adjusting door 15 and the mode door 16, the manufacturing price is increased.

Moreover, since the plates 15a and 16a of the doors 15 and 16 have a predetermined thickness to allow mounting of the sealing member 15c and 16c, the doors 15 and 16 are very heavy and need great material costs by weight.

DISCLOSURE OF INVENTION

Technical Problem

Accordingly, the present invention has been made in an effort to solve the above-mentioned problems occurring in the prior arts, and it is an object of the present invention to provide a door for an air conditioner in a vehicle, in which a thin sheet member is joined to a side of a mesh-type frame in such a way as to protrude more than an end portion of the frame so that the protruding portion of the thin sheet member is in contact with the air-conditioning case to thereby promote sealing of the door for opening and closing a passageway of an air-conditioning case, thereby preventing a bad smell caused by inhabitation of molds, and reducing material costs and manufacturing costs by reducing weight of the door.

Technical Solution

To achieve the above objects, the present invention provides a door for an air conditioner in a vehicle, which is rotatably mounted inside an air-conditioning case for adjusting a degree of opening a specific flow passageway formed inside the air-conditioning case, characterized in that the door comprises: a rotary shaft rotatably mounted inside the air-conditioning case; a frame mounted in such a way as to rotate together with the rotary shaft to adjust a degree of opening the flow passageway; and a thin sheet member joined to the frame to cover a side of the frame in such a way that an edge portion of the thin sheet member outwardly protrudes more than an end portion of the frame, so that the protruding edge portion is in contact with the air-conditioning case so as to close the flow passageway.

Advantageous Effects

As described above, since the thin sheet member is joined to the side of the mesh-type frame in such a way as to protrude more than the end portion of the frame so that the protruding portion of the thin sheet member is in contact with the air-conditioning case to thereby promote sealing of the door for opening and closing a passageway of an air-conditioning case, the door for the air conditioner in the vehicle according to the present invention can prevent a bad smell caused by inhabitation of molds and reduce material costs and manufacturing costs by reducing weight of the door.

Furthermore, the present invention can prevent a deterioration of sealability due to an excessive bending of the edge portion of the thin sheet member when the thin sheet member is in contact with the air-conditioning case since a second stopper is formed at an end portion of the frame to prevent the excessive bending of the edge portion of the thin sheet member.

Moreover, the second stopper can balance the thin sheet member when the thin sheet member of the door, which is in contact with the air-conditioning case excessively seals only one side since the second stopper is formed at the center of the end portion of the frame.

In addition, the door having a structure that the thin sheet member is joined to one side of the frame can be applied to doors of all kinds, such as a mode door, a temperature-adjusting or, an indoor and outdoor air converting door, and so on since the second stopper protruding from the end portion of the frame is shorter than the thin sheet member protruding from the end portion of the frame.

Additionally, since the frame has a baffle formed on the side thereof and the thin sheet member has a baffle-inserting slit for inserting the baffle thereinto so that a right and left distribution amount of the air passing through a passageway of the air-conditioning case can be controlled by the baffle, the door according to the present invention can make temperature of the air discharged to the right and left of the air-conditioning case uniform.

Furthermore, both sides of the door can be sealed only by one thin sheet member since the frame and the rotary shaft are spaced apart from each other at a predetermined interval.

Moreover, the present invention can prevent transformation of the frame since a reinforcing member is formed between a pair of connection members adapted to connect the frame and the rotary shaft with each other.

MODE FOR THE INVENTION

Reference will be now made in detail to the preferred embodiment of the present invention with reference to the attached drawings.

In the present invention, description of the same configuration and action as the prior arts will be omitted.

Figures 1, 2:
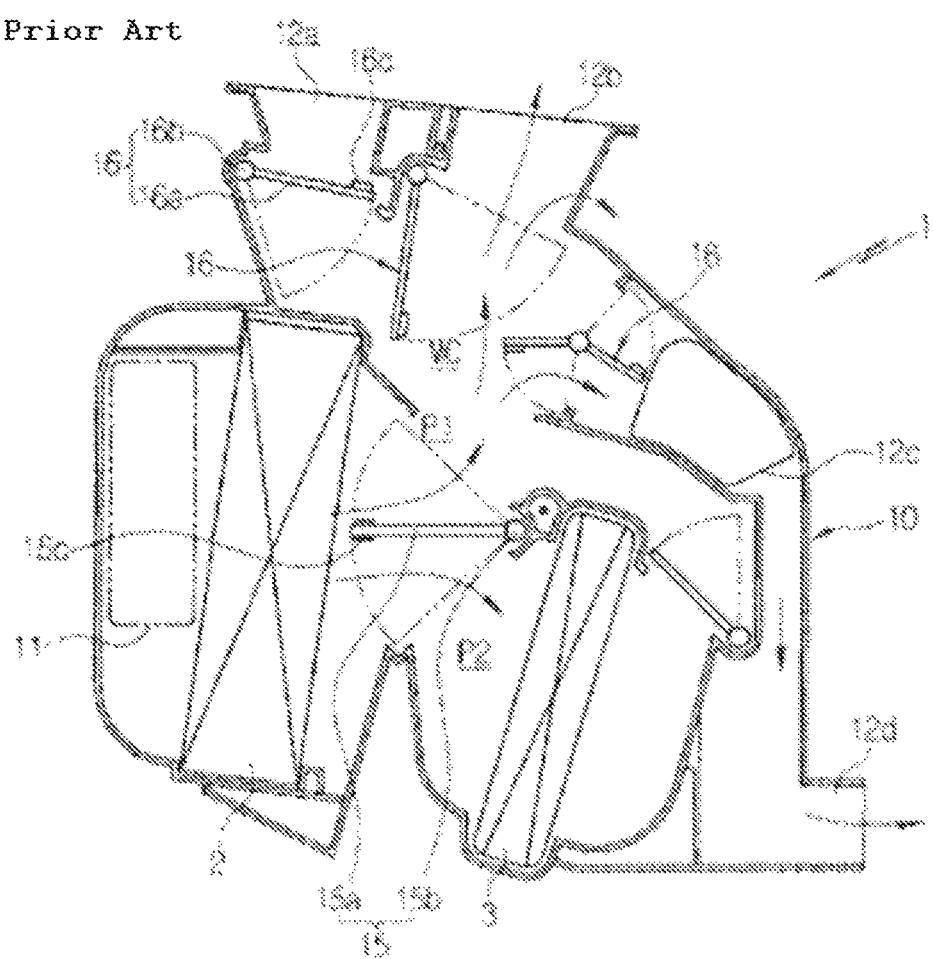
FIG. 1 is a sectional view of a conventional air conditioner for a vehicle.
FIG. 2 is a perspective view of a temperature-adjusting door of FIG. 1.
Figure 3:
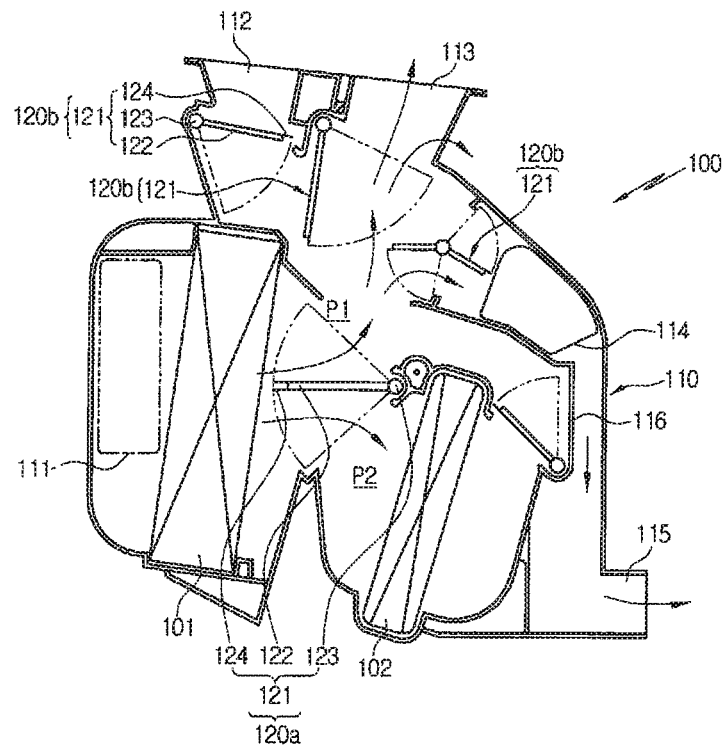
FIG. 3 is a sectional view of an air conditioner for a vehicle, to which a door according to a first preferred embodiment of the present invention is applied.
Figure 4:
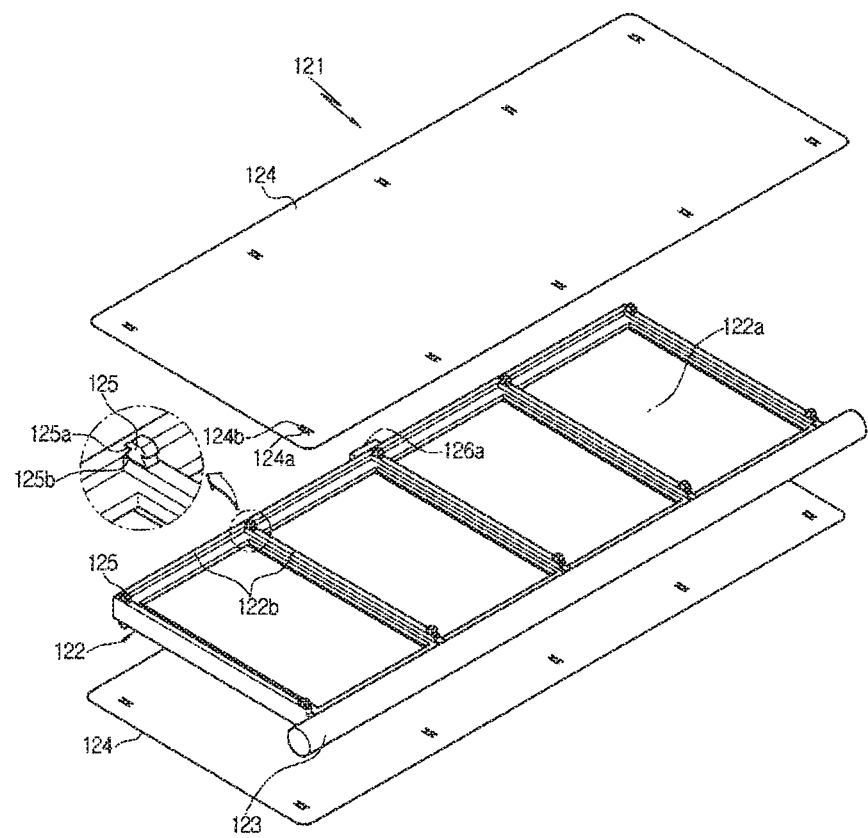
FIG. 4 is an exploded perspective view of the door according to the first preferred embodiment of the present invention.
Figure 5:
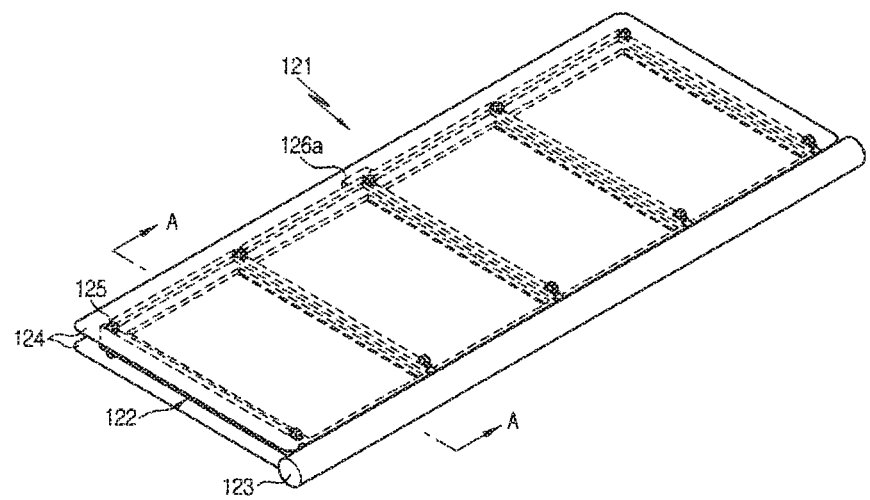
FIG. 5 is an assembled perspective view of the door according to the first preferred embodiment of the present invention.
Figure 6:
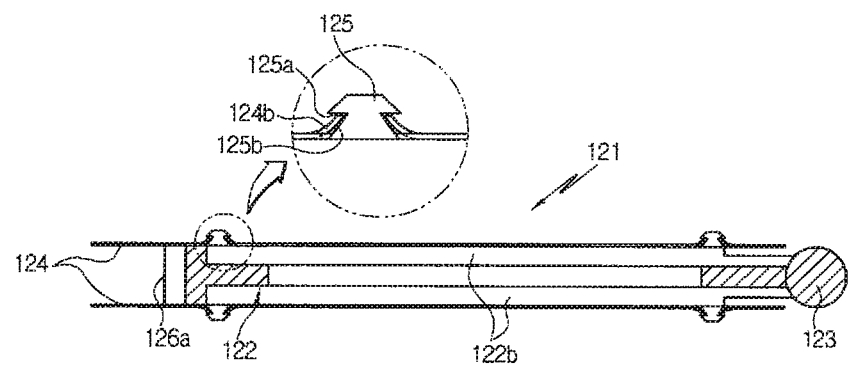
FIG. 6 is a sectional view taken along the line of A-A of FIG. 5.
Figure 7:
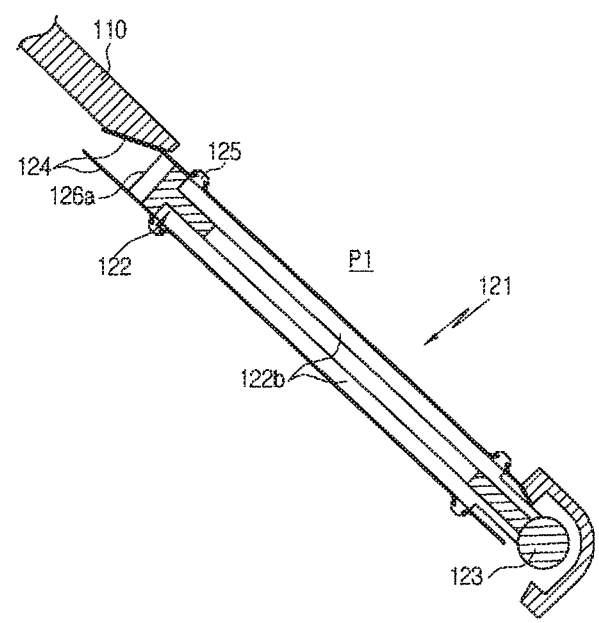
FIG. 7 is a partially sectional view showing a state where the door according to the first preferred embodiment of the present invention closes a passageway inside an air-conditioning case.
Figure 8:
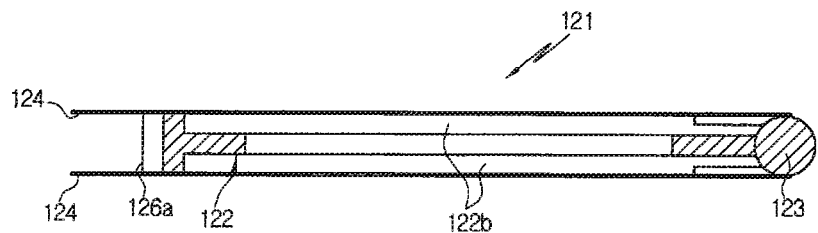
FIG. 8 is a sectional view showing a state where a thin sheet member of the door according to the first preferred embodiment is bonded to a side of a frame.
Figure 9:
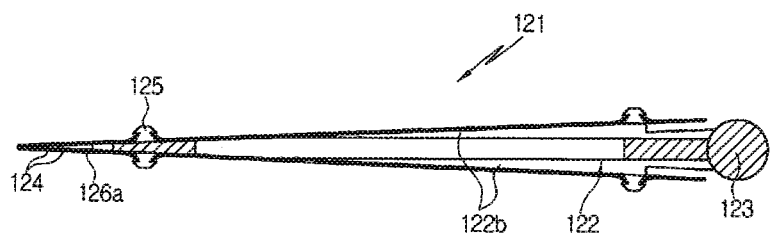
FIG. 9 is a sectional view showing a state where the side of the frame of FIG. 8 is tapered.
Figure 10:
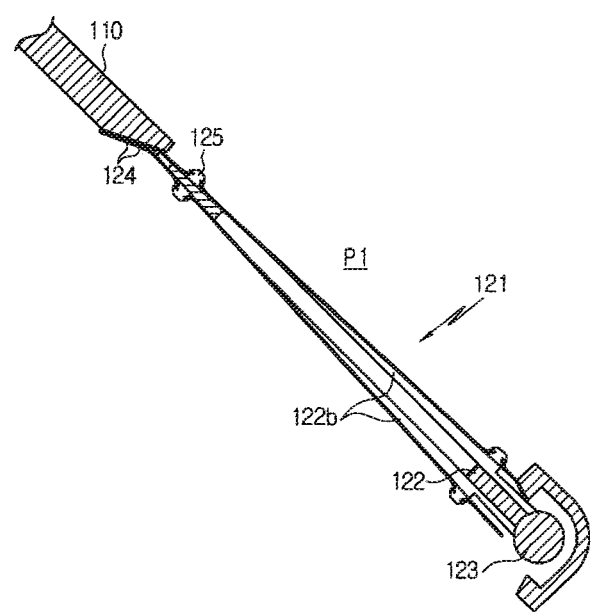
FIG. 10 is a partially sectional view showing a state where the door of FIG. 9 closes the flow passageway inside the air-conditioning case.

FIG. 3 is a sectional view of an air conditioner for a vehicle, to which a door according to a first preferred embodiment of the present invention is applied, FIG. 4 is an exploded perspective view of the door according to the first preferred embodiment of the present invention, FIG. 5 is an assembled perspective view of the door according to the first preferred embodiment of the present invention, FIG. 6 is a sectional view taken along the line of A-A of FIG. 5, FIG. 7 is a partially sectional view showing a state where the door according to the first preferred embodiment of the present invention closes a passageway inside an air-conditioning case, FIG. 8 is a sectional view showing a state where a thin sheet member of the door according to the first preferred embodiment is bonded to a side of a frame, FIG. 9 is a sectional view showing a state where the side of the frame of FIG. 8 is tapered, FIG. 10 is a partially sectional view showing a state where the door of FIG. 9 closes the flow passageway inside the air-conditioning case.

First, the door 121 for the air conditioner in the vehicle according to the present invention is applicable to various air conditioners of a center-mounting type, a semi-center type, a three-piece type, and so on. In the present invention, as an example, a semi-center type air conditioner 100 will be described.

The semi-center type air conditioner 100 will be described in brief. The semi-center type air conditioner 100 includes: an air-conditioning case 110 having an air inflow port 111 formed on an inlet thereof and a plurality of air outflow ports formed on an outlet thereof, and a cold air flow passageway P1 and a warm air flow passageway P2 formed on a passageway therein; and an evaporator 101 and a heater core 102 mounted on the flow passageways formed inside the air-conditioning case 110.

Furthermore, a blower (not shown) is mounted on the air inflow port 111 of the air-conditioning case 110 for selectively introducing the indoor air or the outdoor air through an indoor air inflow hole (not shown) and an outdoor air inflow hole (not shown) opened and closed by an indoor and outdoor air converting door (not shown).

In addition, the plurality of air outflow ports formed on the outlet of the air-conditioning case 110 are a defrost vent 112 for discharging air toward the front window of the vehicle, a face vent 113 for discharging air toward the face of a passenger, who seats on the front seat, and floor vents 114 and 115 for discharging air toward the passenger's feet.

The floor vents 114 and 115 are divided into the floor vent 114 for the front seat to discharge the air toward the feet of the passenger, who seats on the front seat, and the floor vent 115 for the rear seat to discharge the air toward the feet of the passenger, who seats on the rear seat.

In the meantime, a guide wall 116 is formed between the warm air flow passageway P2 of the rear of the heater core 102 and the floor vents 114 and 115 to divide them.

Additionally, a plurality of doors 121 are mounted on the flow passageway formed inside the air-conditioning case 110 in order to adjusting a degree of opening specific flow passageways, namely, the cold air flow passageway P1, the warm air flow passageway P2, the flow passageway facing toward each of the vents 112 to 115, and so on.

The doors 121 are divided into a temperature-adjusting door 120a mounted between the evaporator 101 and the heater core 102 for adjusting a degree of opening the cold air flow passageway P1 bypassing the heater core 102 and the warm air flow passageway P2 passing through the heater core 102, and mode doors 120b mounted on upstream passageways of the vents for adjusting a degree of opening the defrost vent 112, the face vent 113 and the floor vents 114 and 115.

Meanwhile, the temperature-adjusting door 120a and the mode doors 120b are connected to a cam (not shown) or a lever (not shown) actuated by an actuator (not shown) mounted on the outer surface of the air-conditioning case 110, and hence, adjust a degree of opening the cold and warm air flow passageways P1 and P2 and the vents 112 to 115 while rotating.

Hereinafter, the doors 121 will be described in more detail.

The door 121 includes: a rotary shaft 123 rotatably mounted on both side wall inside the air-conditioning case 110; a frame 122 formed on a side of the rotary shaft 123 in such a way as to be rotated together with the rotary shaft 123 for adjusting a degree of opening the flow passageway formed inside the air-conditioning case 110; and a thin sheet member 124 joined to the frame 122 in such a way as to cover the side of the frame 122, an edge portion of the thin sheet member 124 protruding outwardly longer than the end portion of the frame 122 in such a way that the protruding edge portion is in contact with the air-conditioning case 111 when the flow passageway is closed.

That is, the thin sheet member 124 is larger than the frame 122, and hence, when the thin sheet member 124 is joined to the side of the frame 122, the edge portion of the thin sheet member 124 outwardly protrudes more than the end portion of the frame 122.

In this instance, it is preferable that the edge portion of the thin sheet member 124 does not protrude toward the rotary shaft 124 at the end portion of the frame 122 connected with the rotary shaft 123.

In the meantime, the frame 122 and the thin sheet member 124 are respectively formed in a quadrangular form (rectangular form in the drawings).

Furthermore, it is preferable that the thin sheet member 124 is a sheet film made of polyethylene or polypropylene, but may be made of one of various materials.

Moreover, the sheet film can prevent inhabitation of molds to the maximum, and reduce noise since it can be in close contact with the inner wall surface of the air-conditioning case 110 and easily separated from the air-conditioning case 110 due to its low coefficient of friction.

Additionally, while the thin sheet member 124 is joined only to the one side of the frame 122 in case where the sealing is needed only at one side like the mode door 120b, the two separate thin sheet members 124 are joined to both sides of the frame 122 in case where the sealing is needed at both sides like the temperature-adjusting door 120a.

In addition, the frame 122 is constructed of a mesh form having a plurality of through holes 122a to reduce weight of the doors 121.

That is, the frame 122 is formed in constructed of the mesh form (a lattice form) to minimize weight since it is required to form only a framework to join the thin sheet member 124 thereto.

In this instance, even though the frame 122 is constructed of the mesh form, since the side of the frame 122 is covered with the thin sheet member 124, air cannot pass through the mesh-shaped frame 122.

Furthermore, in order to join the thin sheet member 124 to the side of the frame 122, the following three methods can be used.

First, the frame 122 has a plurality of hooks 125 protruding from the side thereof and respectively having retaining jaws 125a, and the thin sheet member 124 has a plurality of coupling holes 124a, which can be fit to the hooks 125.

Moreover, the coupling holes 124a of the thin sheet member 124 respectively have retaining portions 124b formed in such a way as to be partially cut at both sides thereof so that the retaining portions 125b can be easily joined to the hooks 125 and retained to the retaining jaws 125a of the hooks 125 after the joining.

In the meantime, the hook 125 has an inclined surface 125b formed on a lower end thereof in such a way that an end portion of the retaining portion 124b is closely caught to a lower surface of the retaining jaw 125a of the hook 125 when the coupling holes 124a of the thin sheet member 124 are joined to the hooks 125 of the frame 122.

Second, as shown in FIG. 8, the thin sheet member 124 may be bonded or fused to the side of the frame 122.

Figure 20:
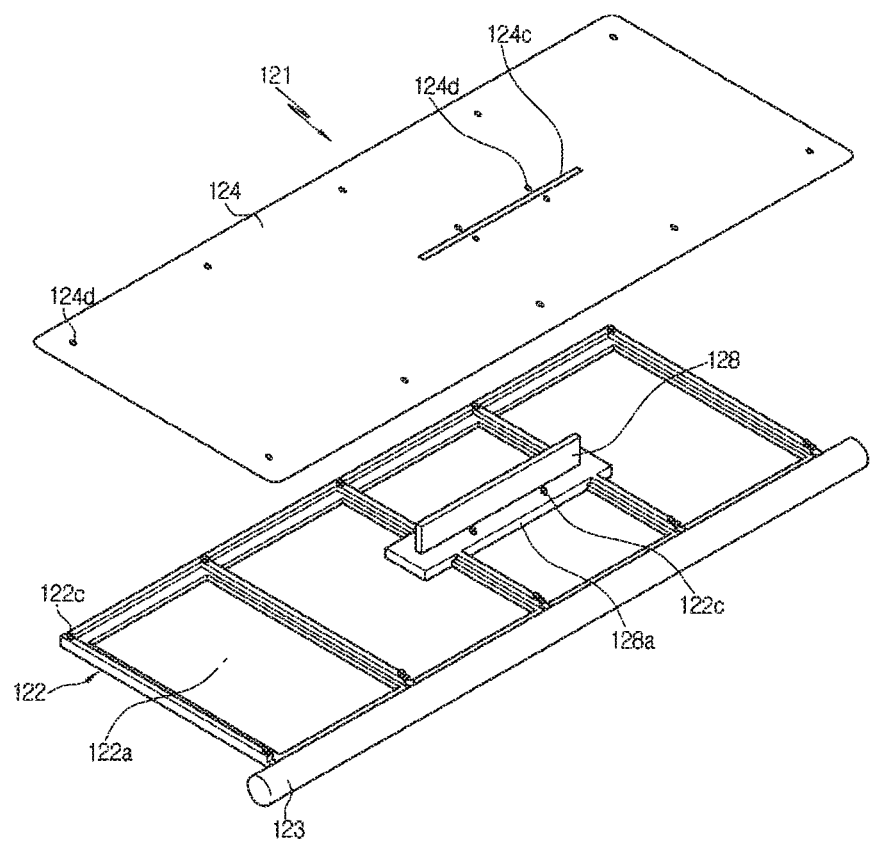
FIG. 20 is an exploded perspective view of a door according to a third preferred embodiment of the present invention.

Third, as shown in FIG. 20, the frame 122 has a plurality of fusion pins 122c protruding from the side thereof and the thin sheet member 124 has a plurality of coupling holes 124d to be fit to the fusion pins 122c.

After that, when the coupling holes 124d of the thin sheet member 124 are fit to the fusion pins 122c of the frame 122, a position of the thin sheet member 124 can be exactly set. After that, when heat is applied to the fusion pins 122c, the thin sheet member 124 and the frame 122 are joined with each other by means of fusion.

Moreover, the frame 122 has a projection portion 122b formed on the side thereof to reduce a contact area when it is joined to the thin sheet member 124. Then, an amount of adhesives can be reduced when the thin sheet member 124 is bonded to the frame 122.

Additionally, when an end portion of the projection portion 122b connected with the rotary shaft 123 is formed in a tiered manner, the edge portion of the thin sheet member 124 adjacent to the rotary shaft 123 is spaced apart from the side of the frame 12 at a predetermined interval, and thereby, can be in elastic contact with the air-conditioning case 110. Of course, also the edge portion of the thin sheet member 124, which protrudes more than the end portion of the frame 122, has a predetermined elasticity.

In the meantime, in order to prevent air leakage between the thin sheet member 124 and the rotary shaft 123, it would be appreciated that an end portion of the thin sheet member 124 is joined to the rotary shaft 123. That is, as shown in FIG. 8, the end portion of the thin sheet member 124 is bonded to the rotary shaft 123 or joined to a recess (not shown) formed on the rotary shaft 123.

Furthermore, when the flow passageway is closed by the rotation of the door 121, only the edge portion of the thin sheet member 124 is in contact with the air-conditioning case 110. In this instance, the frame 122 has a first stopper 126a protruding from the end portion of the frame 122 so that the frame 122 is restrained to the air-conditioning case 110 not to go over the air-conditioning case 110.

Moreover, as shown in FIG. 9, both sides of the frame 122 may be tapered at a predetermined angle, and in this instance, the thin sheet members 124 joined to both sides of the frame 122 via the hooks 125 or by means of bonding are also inclined at a predetermined angle so that the end portions of the thin sheet members 124 are in contact with each other.

As described above, when the end portions of the thin sheet members 124 joined to both sides of the frame 122 are in contact with each other, it can prevent noise generated when wind goes between the thin sheet members 124.

In the meantime, as described above, both sides of the frame 122 are all inclined at the predetermined angle, but if necessary, at least one of the two sides of the frame 122 may be inclined at the predetermined interval.

Figure 11:
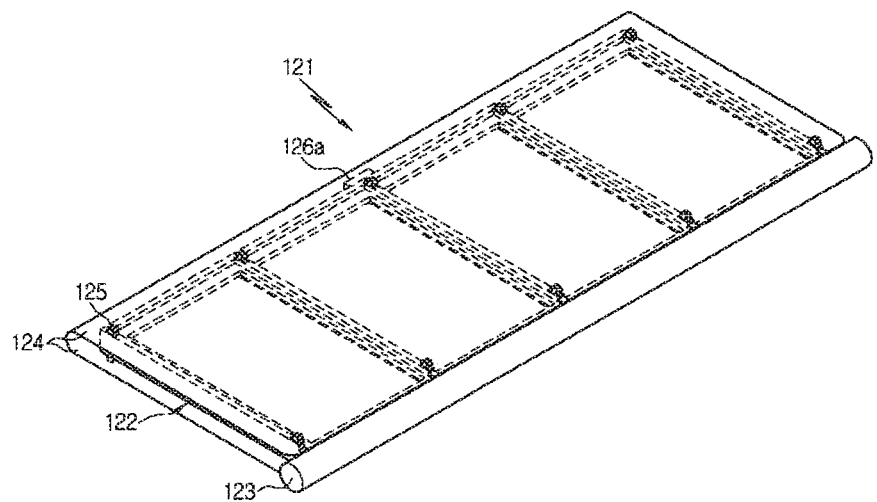
FIG. 11 is a perspective view showing a state where the thin sheet member is formed in a U shape.
Figure 12:
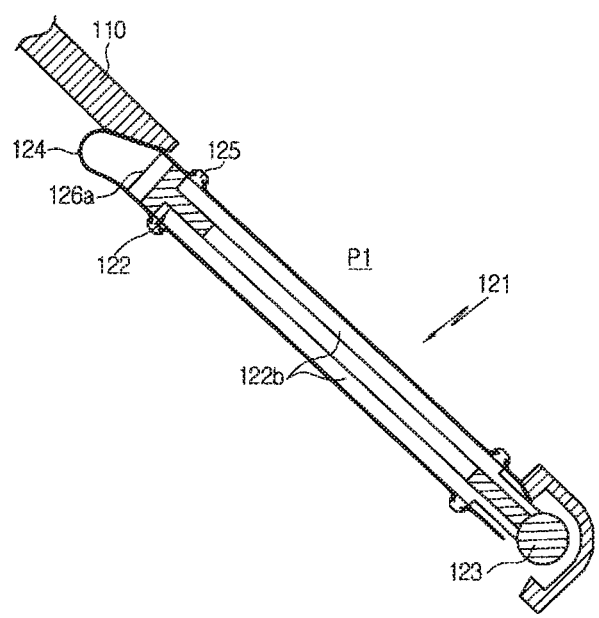
FIG. 12 is a partially sectional view showing a state where the door of FIG. 10 closes the flow passageway inside the air-conditioning case.

FIG. 11 is a perspective view showing a state where the thin sheet member is formed in a U shape, and FIG. 12 is a partially sectional view showing a state where the door of FIG. 10 closes the flow passageway inside the air-conditioning case. In the above, the thin sheet members 124 of a flat type are joined to both sides of the frame 122, but in FIG. 11, the thin sheet member 124 is bent in a U-shape and both end portions of the thin sheet member 124 are joined to both sides of the frame 122.

In this instance, the joining method between the frame 122 and the thin sheet member 124 is the same as the above.

Furthermore, also the U-shaped portion of the thin sheet member 124 outwardly protrudes more than the end portion of the frame 122.

Moreover, when the door 121 closes the flow passageway formed inside the air-conditioning case 110, the U-shaped portion of the thin sheet member 124 elastically is in elastic contact with the air-conditioning case 110 to perform sealing.

Hereinafter, an operation of the door for the air conditioner in the vehicle according to the first preferred embodiment of the present invention will be described.

First, the air blown by a blower (not shown) is converted into cold air while passing through the evaporator 101.

The air cooled while passing through the evaporator 101 bypasses the heater core 102 through the cold air flow passageway P1 or passes through the heater core 102 through the warm air flow passageway P2 according to adjustment of the degree of opening the cold and warm air flow passageways P1 and P2 to thereby be converted into warm air.

Next, the cold air or warm air selectively passing through the cold air flow passageway P1 and the warm air flow passageway P2 is supplied to the inside of the vehicle through the vents 112 to 115 adjusted in a degree of opening by the mode door 120b according to an air-conditioning mode to thereby cool or heat the inside of the vehicle.

Furthermore, when the temperature-adjusting door 120a closes the cold air flow passageway P1 or the warm air flow passageway P2 or the mode door 120b closes the flow passageways facing toward the vents 112 to 115, the edge portion of the thin sheet member 124 protruding more than the end portion of the frame 122 is in elastic contact with the inner wall surface of the air-conditioning case 110.

As described above, when the door 121 mounted inside the air-conditioning case 110 closes the cold air flow passageway P1 or the warm air flow passageway P2 or the flow passageways facing toward the vents 112 to 115 inside the air-conditioning case 110, the edge portion of the thin sheet member 124 protruding more than the end portion of the frame 122 is in elastic contact with the inner wall surface of the air-conditioning case 110 around the flow passageway to thereby perform sealing.

Figure 13:
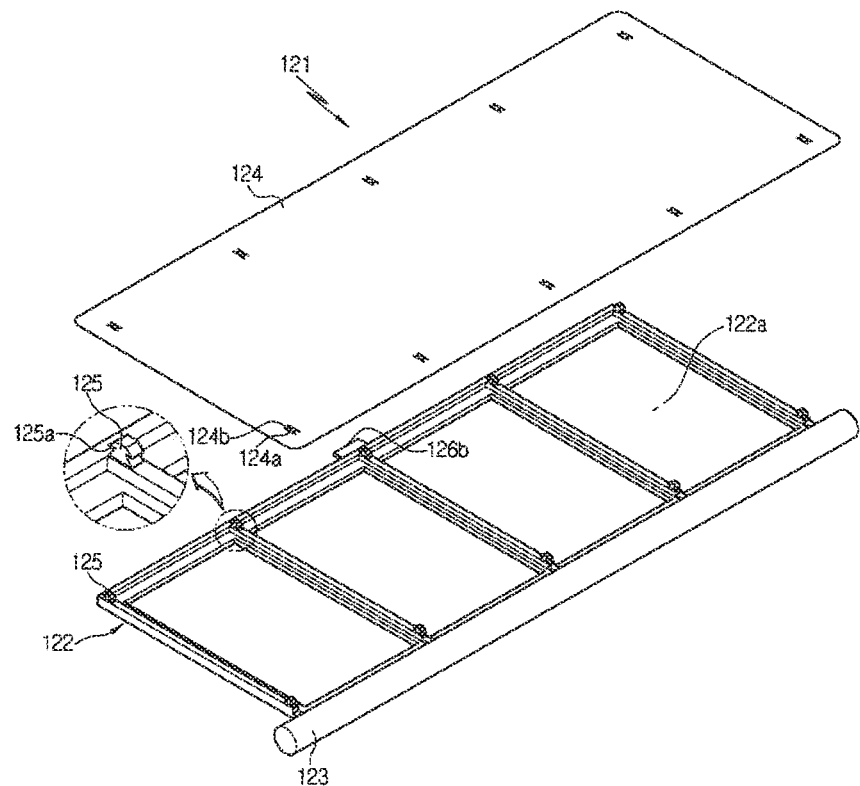
FIG. 13 is an exploded perspective view of a door according to a second preferred embodiment of the present invention.
Figure 14:
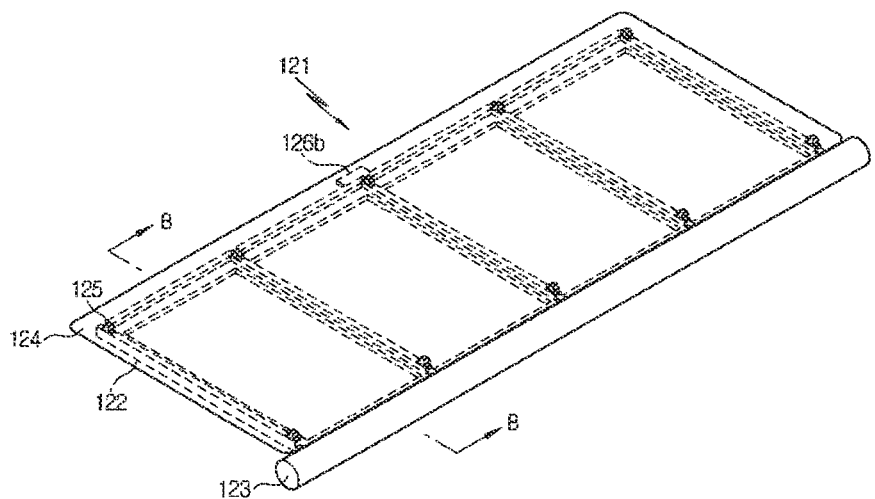
FIG. 14 is an assembled perspective view of the door according to the second preferred embodiment.
Figure 15:
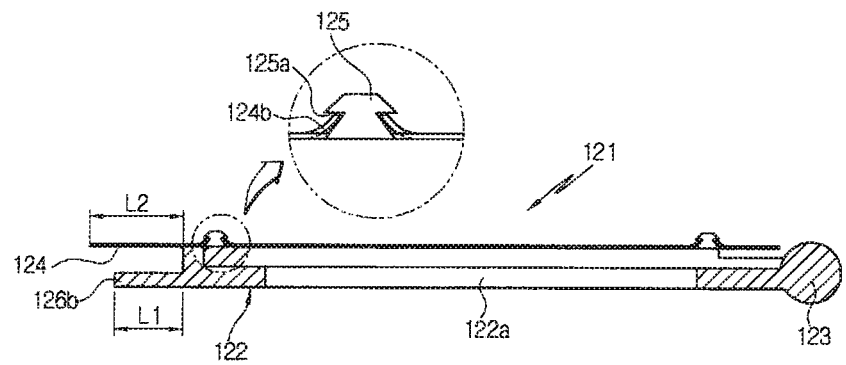
FIG. 15 is a sectional view taken along the line of B-B of FIG. 14.
Figure 16:
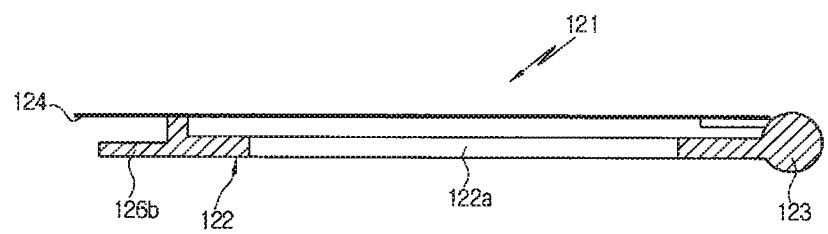
FIG. 16 is a sectional view showing a state where a thin sheet member of the door according to the second preferred embodiment is bonded to a side of a frame.
Figure 17:
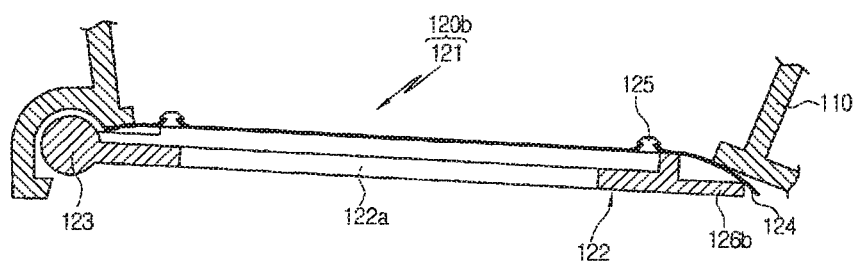
FIG. 17 is a partially sectional view showing a state where the door according to the second preferred embodiment is applied to a mode door and closes the flow passageway inside the air-conditioning case.
Figure 18:
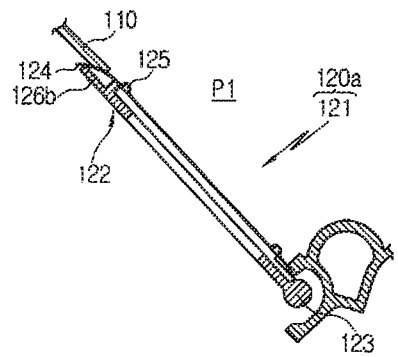
FIGS. 18 and 19 are partially sectional views showing a state where the door according to the second preferred embodiment is applied to a temperature-adjusting door and closes a cold air flow passageway and a warm air flow passageway inside the air-conditioning case.
Figure 19:
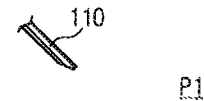
Figure 19:
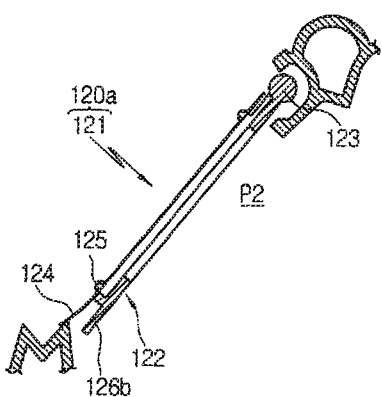

FIG. 13 is an exploded perspective view of a door according to a second preferred embodiment of the present invention, FIG. 14 is an assembled perspective view of the door according to the second preferred embodiment, FIG. 15 is a sectional view taken along the line of B-B of FIG. 14, FIG. 16 is a sectional view showing a state where a thin sheet member of the door according to the second preferred embodiment is bonded to a side of a frame, FIG. 17 is a partially sectional view showing a state where the door according to the second preferred embodiment is applied to a mode door and closes the flow passageway inside the air-conditioning case, and FIGS. 18 and 19 are partially sectional views showing a state where the door according to the second preferred embodiment is applied to a temperature-adjusting door and closes a cold air flow passageway and a warm air flow passageway inside the air-conditioning case. In the second preferred embodiment, only parts different from the first embodiment will be described.

As described above, in the second embodiment, the frame 122 has a second stopper 126b protruding from the end portion of the frame 122 to thereby prevent that the edge portion of the thin sheet member 124 is excessively bent when it is in contact with the air-conditioning case 110.

That is, the second stopper 126b protrudes from the center of an end portion of the frame 122 opposed to the rotary shaft 123, and in this instance, it is preferable that the second stopper 126b is formed on a side opposed to the side of the frame 122, which is joined with the thin sheet member 124.

Accordingly, the second stopper 126b is spaced apart from the edge portion of the thin sheet member 124 at a predetermined interval.

Here, a side of the second stopper 126b, which puts opposite the thin sheet member 124, may be formed in a plane, but may have a stepped portion to easily control an initial interval between the thin sheet member 124 and the second stopper 126b.

As described above, since the edge portion of the thin sheet member 124 is elastically bent inside a space formed between the second stopper 126b and the thin sheet member 124, it can prevent excessive bending or curving of the thin sheet member 124.

For your reference, if the edge portion of the thin sheet member 124 is bent excessively, the thin sheet member 124 is not restored to the original state and loses elasticity to thereby be deteriorated in sealability.

Furthermore, as shown in FIGS. 18 and 19, in case where the door 121 bidirectionally performs sealing like the temperature-adjusting door 120a, namely, in case where the thin sheet member 124 joined to the side of the frame 122 faces toward a sealing face of the air-conditioning case 110 as shown in FIG. 18, there is no problem since the thin sheet member 124 is in contact with the sealing face of the air-conditioning case 110. However, in case where the other side of the frame 122 having the second stopper 126b faces toward the sealing face of the air-conditioning case 110 as shown in FIG. 19, the second stopper 126b comes in contact with the sealing face of the air-conditioning case 110 before the thin sheet member 124 to thereby cause interference. Accordingly, it is preferable that a length (L) of the second stopper 126b protruding from the end portion of the frame 122 is smaller than a length (L2) of the thin sheet member 124 protruding from the end portion of the frame.

In case where the other side of the frame 122 having the second stopper 126b faces toward the sealing face of the air-conditioning case 110 as shown in FIG. 19, the second stopper 126b is received in an inner area of the sealing face of the air-conditioning case 110, so that only the thin sheet member 124 protruding longer than the second stopper 126b comes in contact with the sealing face of the air-conditioning case 110 to perform sealing. In this instance, the hook 125 may have an additional stopper (not shown) to control a bending amount of the thin sheet member 124.

Additionally, the second stopper 126b is formed at a central portion of the end portion of the frame 122 to balance the thin sheet member 124 when the thin sheet member 124 of the door 121, which is in contact with the air-conditioning case 110, performs an excessive sealing only at one side.

In the meantime, in the drawings, only one second stopper 126b is formed at the end portion of the frame 122, but a plurality of the second stoppers 126b may be formed.

As described above, in the door 121 according to the second preferred embodiment, since the thin sheet member 124 is joined only to one side of the frame 122, it is more proper to the mode door 120b, but may be used as the temperature-adjusting door 120a.

That is, when the mode door 120b closes the flow passageway facing toward each of the vents 112 to 115, as shown in FIG. 17, the edge portion of the thin sheet member 124, which protrudes more than the end portion of the frame 122, is in elastic contact with the inner wall surface of the air-conditioning case 110.

In this instance, when the edge portion of the thin sheet member 124 is bent like a bow while being in elastic contact with the air-conditioning case 110, since the second stopper 126b formed on the end portion of the frame 122 supports the edge portion of the thin sheet member 124, it can prevent that the edge portion of the thin sheet member 124 is excessively bent or curved to thereby prevent a deterioration in sealability.

As described above, when the door 121 mounted inside the air-conditioning case 110 closes the flow passageway facing toward each of the vents 112 to 115, the edge portion of the thin sheet member 124 protruding more than the end portion of the frame 122 is in elastic contact with the air-conditioning case 110 around the flow passageway to thereby perform sealing.

In the meantime, like the mode door 120b, when the temperature-adjusting door 120a closes the cold air flow passageway P1 or the warm air flow passageway P2, the temperature-adjusting door 120a operates as shown in FIGS. 18 and 19.

Figure 21:
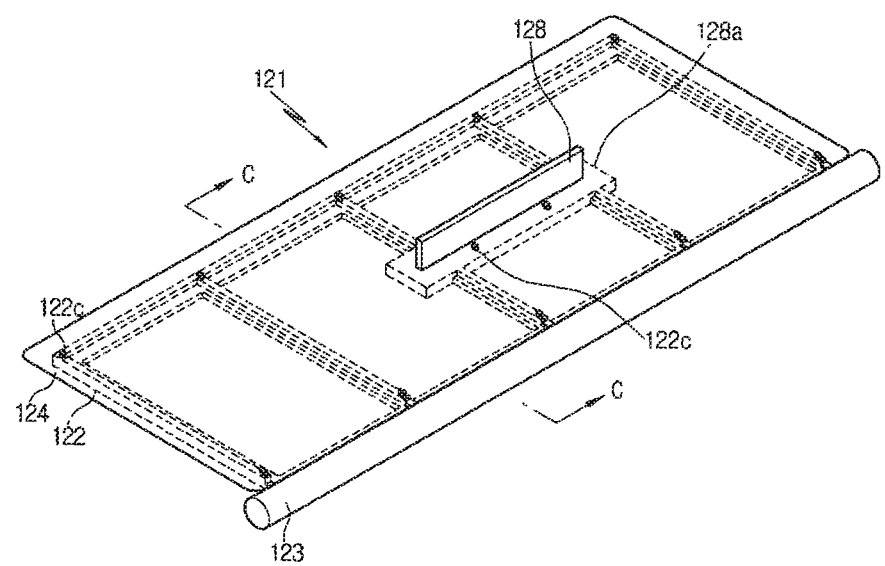
FIG. 21 is an assembled perspective view of the door according to the third preferred embodiment.
Figure 22:
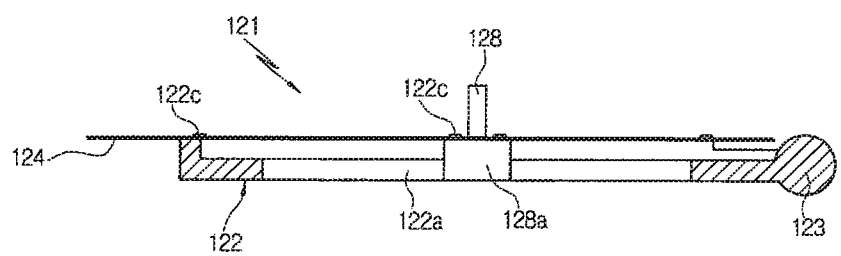
FIG. 22 is a sectional view taken along the line of C-C of FIG. 21.
Figure 23:
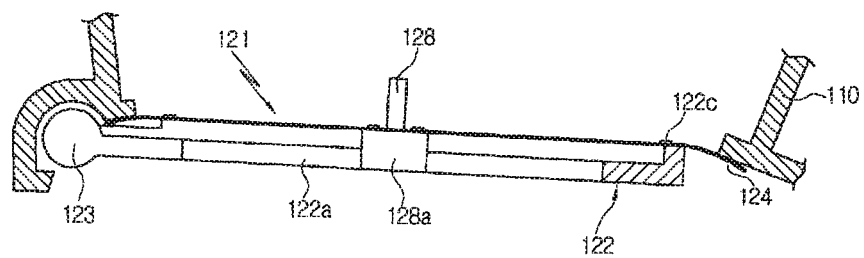
FIG. 23 is partially sectional view showing a state where the door according to the third preferred embodiment closes a passageway inside the air-conditioning case.
Figure 24:
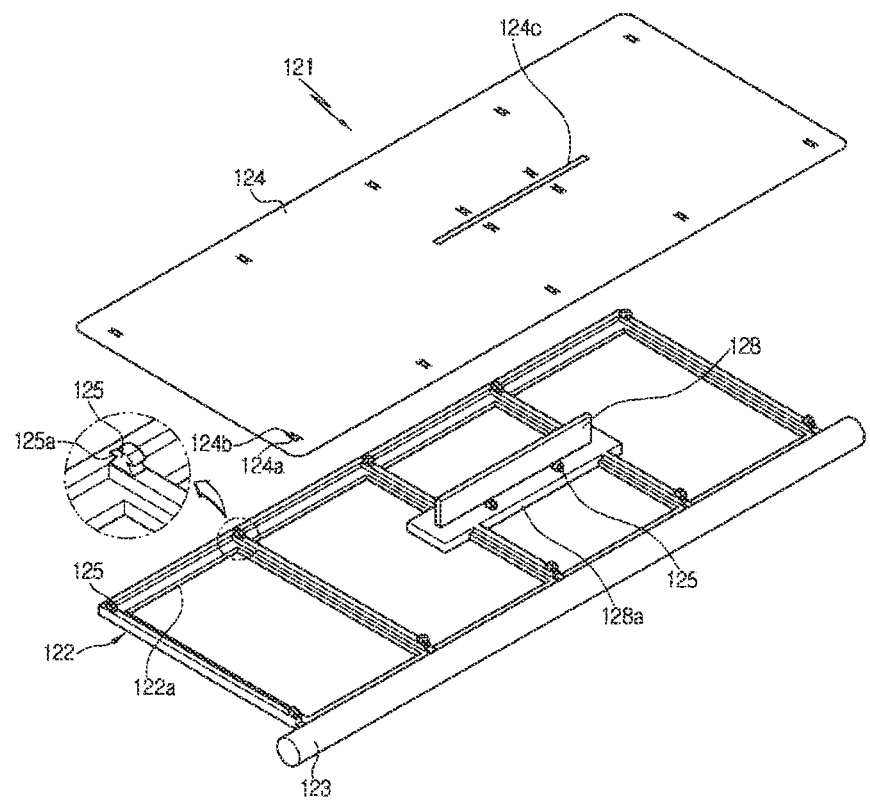
FIG. 24 is an exploded perspective view showing a state where a thin sheet member and a frame of the door according to the third preferred embodiment are joined with each other via hooks.
Figure 25:
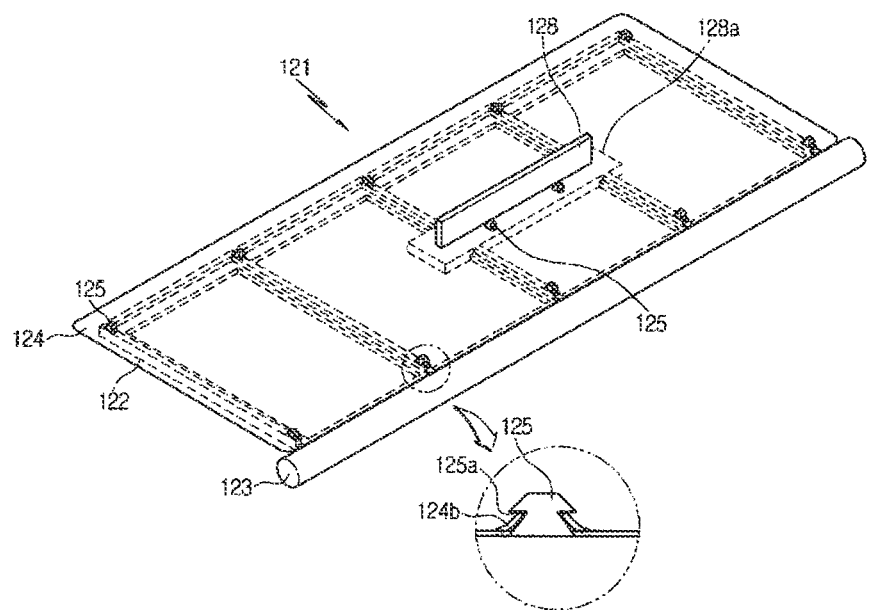
FIG. 25 is an assembled perspective view of the door of FIG. 24.
Figure 26:
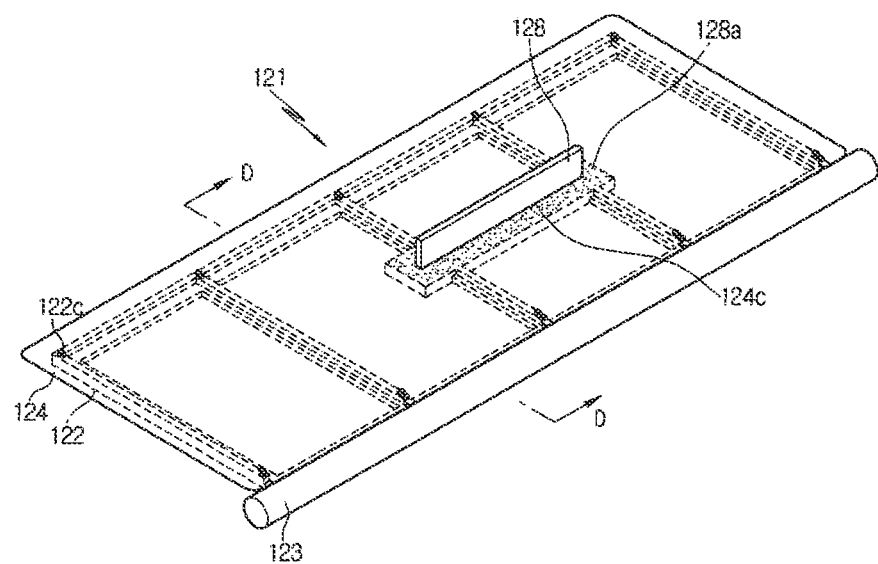
FIG. 26 is a perspective view showing a state where an extension portion of a baffle of the door according to the third preferred embodiment is bonded around a baffle-inserting slit of the thin sheet member by means of thermal fusion, ultrasonic fusion or adhesives.
Figure 27:
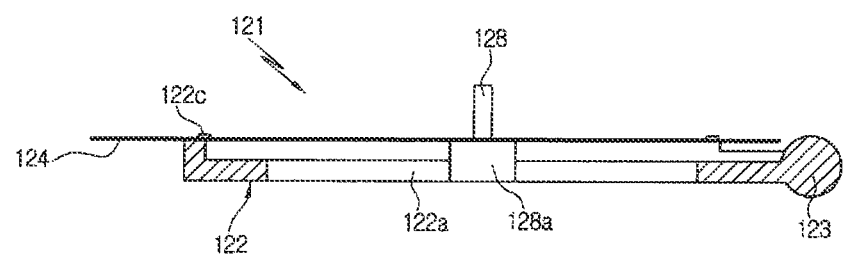
FIG. 27 is a sectional view taken along the line of D-D of FIG. 26.

FIG. 20 is an exploded perspective view of a door according to a third preferred embodiment of the present invention, FIG. 21 is an assembled perspective view of the door according to the third preferred embodiment, FIG. 22 is a sectional view taken along the line of C-C of FIG. 21, FIG. 23 is partially sectional view showing a state where the door according to the third preferred embodiment closes a passageway inside the air-conditioning case, FIG. 24 is an exploded perspective view showing a state where a thin sheet member and a frame of the door according to the third preferred embodiment are joined with each other via hooks, FIG. 25 is an assembled perspective view of the door of FIG. 24, FIG. 26 is a perspective view showing a state where an extension portion of a baffle of the door according to the third preferred embodiment is bonded around a baffle-inserting slit of the thin sheet member by means of thermal fusion, ultrasonic fusion or adhesives, and FIG. 27 is a sectional view taken along the line of D-D of FIG. 26. In the third preferred embodiment, only parts different from the first embodiment will be described.

As shown in the drawings, in the third preferred embodiment, a baffle 128 protrudes from a side of the frame 122 to guide a flow of air flowing around the door 121, and the thin sheet member 124 has a baffle-inserting slit 124c formed at a position corresponding to a position of the baffle 128 to insert the baffle 128 thereinto.

While the thin sheet member 124 is joined only to one side of the frame 122 in case where the door 121 according to the third preferred embodiment is applied to the mode door 120b, the thin sheet member 124 is joined to both sides of the frame 122 in case where the door 121 is applied to the temperature-adjusting door 120a.

Furthermore, in case of the temperature-adjusting door 120a, it is preferable that the baffle 128 and the thin sheet member 124 are all mounted on one side of the frame 122 and only the thin sheet member 124 is mounted on the other side of the frame 122.

Moreover, the baffle 128 protrudes at a proper position of one side of the frame 122 in various forms to control a right and left distribution amount of the air passing through the flow passageway formed inside the air-conditioning case 110.

That is, while the air is distributed smaller to a wide baffle-occupying area of the flow passageway formed in side the air-conditioning case 110 due to a larger resistance of the air, the air is distributed larger to a small baffle-occupying area of the flow passageway due to a smaller resistance of the air.

So, if a location or form of the baffle 128 formed on one side of the frame 122 is adjusted properly, temperature of the air finally discharged to the right and left of the air-conditioning case 110 can be controlled uniformly.

As an example, more cold air is distributed to a high temperature part inside the air-conditioning case 110 and smaller cold air is distributed to a low temperature part, so that temperature of the air finally discharged to the right and left of the air-conditioning case 110 is controlled uniformly.

In addition, since the baffle 128 protrudes from the side of the frame 122, the thin sheet member 124 has a baffle-inserting slit 124c formed at a position corresponding to the baffle 128.

That is, when the thin sheet member 124 is joined to the side of the frame 122, the baffle 128 goes through the baffle-inserting slit 124c of the thin sheet member 124.

Furthermore, the baffle 128 of the frame 122 has an extension portion 128a formed on a lower portion thereof to be joined around the baffle-inserting slit 124c of the thin sheet member 124.

That is, the extension portion 128a formed on the lower portion of the baffle 128 is closely joined around the baffle-inserting slit 124c of the thin sheet member 124 to thereby prevent that the air leaks out through the baffle-inserting slit 124c.

Here, the extension portion 128a formed on the lower portion of the baffle 128 can be closely joined around the baffle-inserting slit 124c of the thin sheet member 124 by means of coupling of the hooks 125 or thermal fusion of the fusion pins 122c as described above, but it is more preferable that the circumference of the baffle-inserting slit 124c is sealed to prevent that the air leaks out through the baffle-inserting slit 124c of the thin sheet member 124.

For this, as shown in FIGS. 26 and 27, a contact surface of the extension portion 128a of the baffle 128 and a contact surface formed around the baffle-inserting slit 124c are in face-to-face bonding by means of one of thermal fusion, ultrasonic fusion and adhesives.

As described above, the door 121 according to the third preferred embodiment can properly control the right and left distribution amount of the air passing through the flow passageway of the air-conditioning case 110 by the baffle 128 protruding from the side of the frame 122 to thereby make temperature of the air finally discharged to the right and left of the air-conditioning case 110 uniform.

Figure 28:
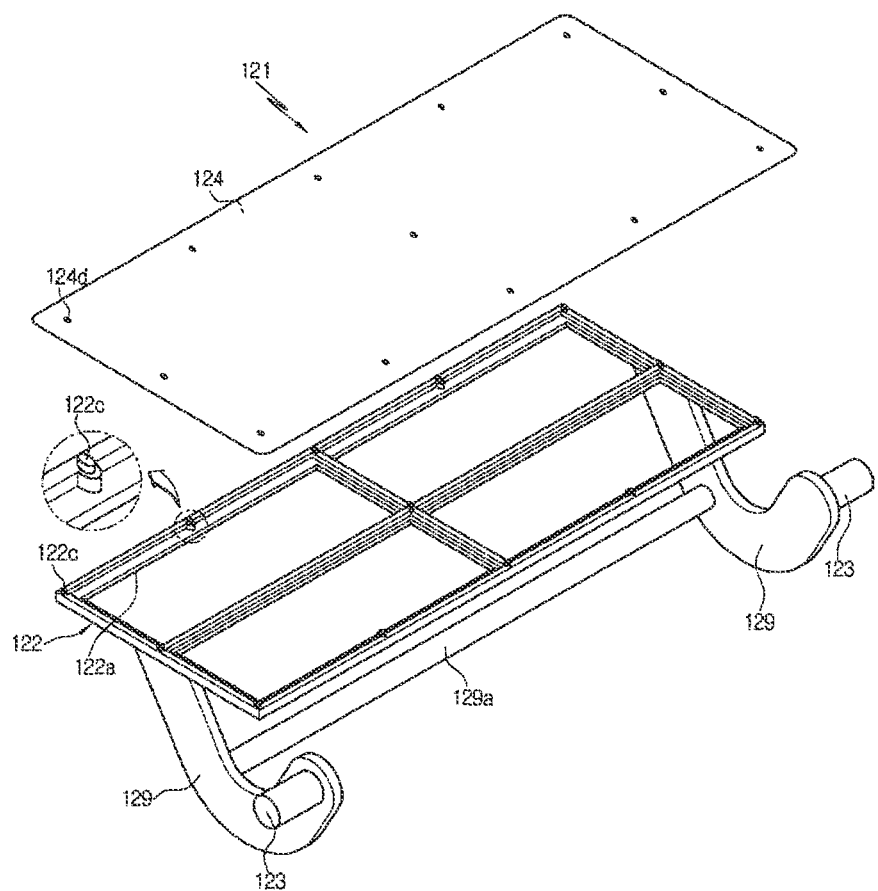
FIG. 28 is an exploded perspective view of a door according to a fourth preferred embodiment of the present invention.
Figure 29:
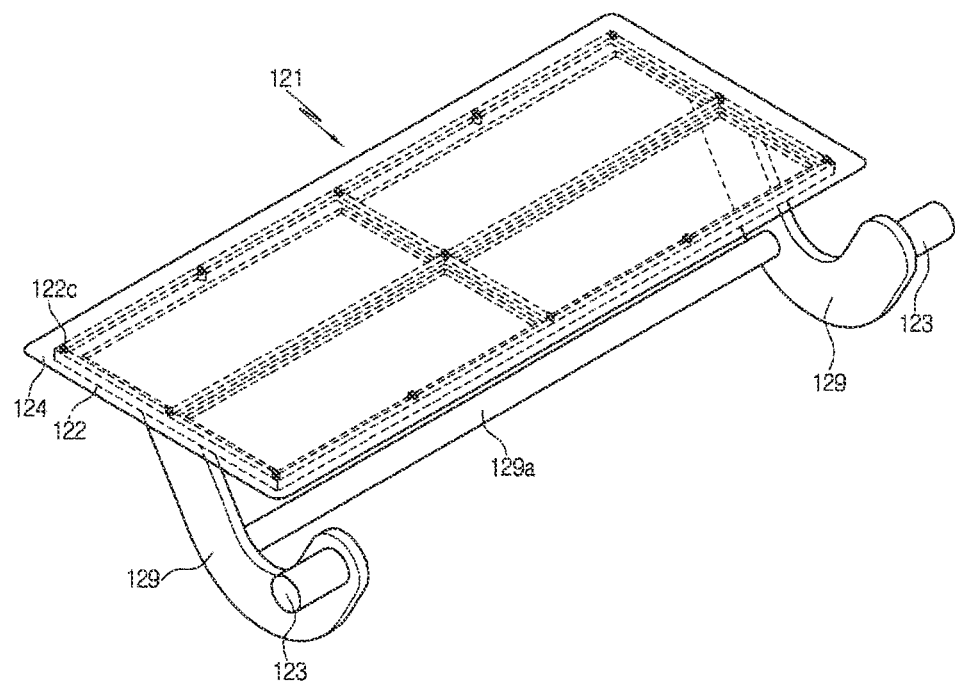
FIG. 29 is an assembled perspective view of the door according to the fourth preferred embodiment.
Figure 30:
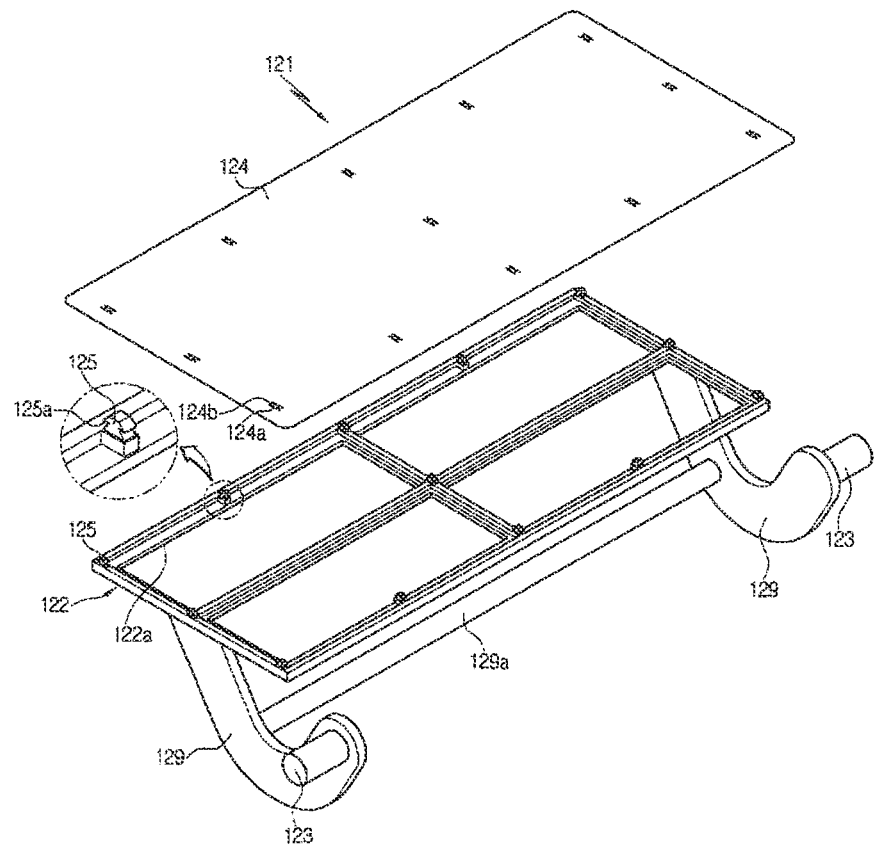
FIG. 30 is an exploded perspective view showing a state where a thin sheet member is joined to a frame via hooks of the frame.
Figure 31:
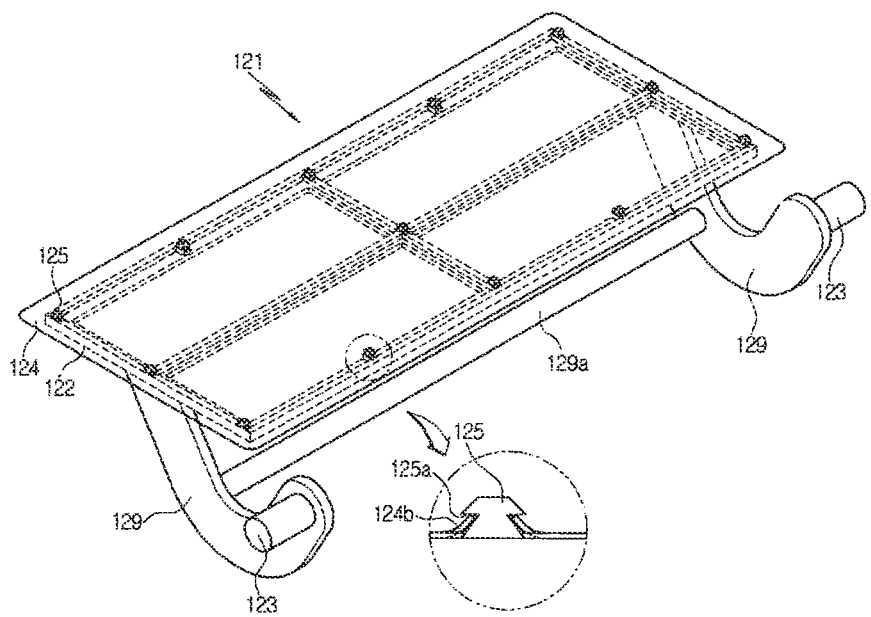
FIG. 31 is an assembled perspective view showing the state where the thin sheet member is joined to the frame via the hooks of the frame.
Figure 32:
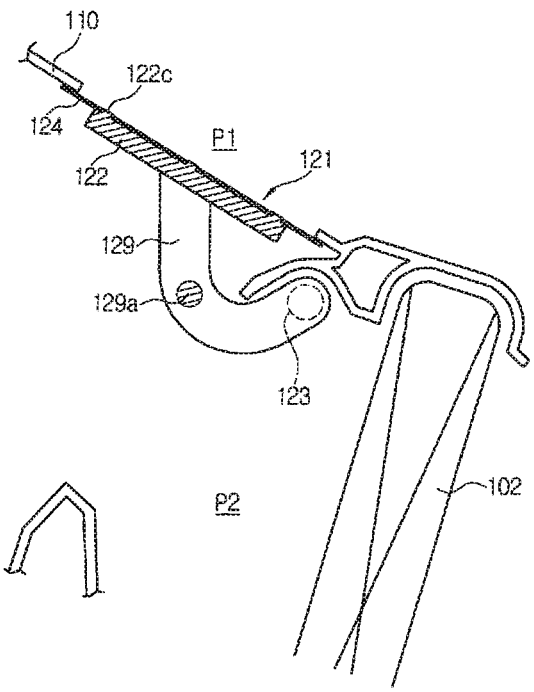
FIG. 32 is a partially sectional view showing a state where the door according to the fourth preferred embodiment closes the cold air flow passageway formed inside the air-conditioning case.
Figure 33:
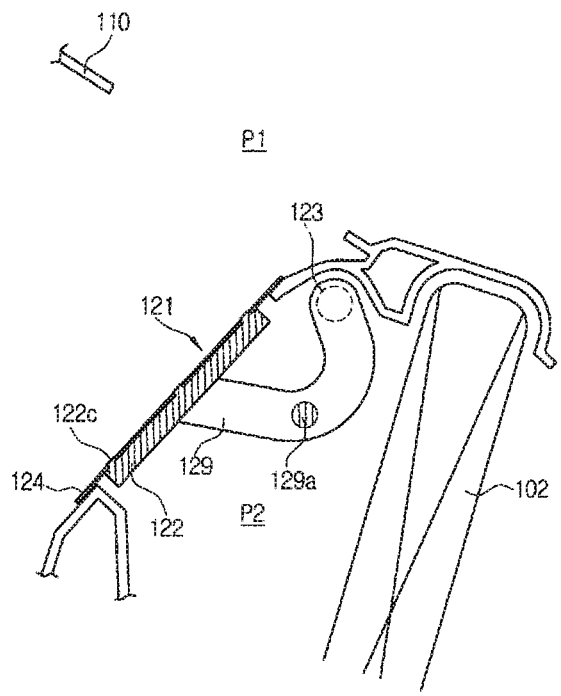
FIG. 33 is a partially sectional view showing a state where the door according to the fourth preferred embodiment closes the warm air flow passageway formed inside the air-conditioning case.

FIG. 28 is an exploded perspective view of a door according to a fourth preferred embodiment of the present invention, FIG. 29 is an assembled perspective view of the door according to the fourth preferred embodiment, FIG. 30 is an exploded perspective view showing a state where a thin sheet member is joined to a frame via hooks of the frame, FIG. 31 is an assembled perspective view showing the state where the thin sheet member is joined to the frame via the hooks of the frame, FIG. 32 is a partially sectional view showing a state where the door according to the fourth preferred embodiment closes the cold air flow passageway formed inside the air-conditioning case, and FIG. 33 is a partially sectional view showing a state where the door according to the fourth preferred embodiment closes the warm air flow passageway formed inside the air-conditioning case. In the fourth preferred embodiment, only parts different from the first embodiment will be described.

As shown in the drawings, in the fourth preferred embodiment, the frame 122 is spaced apart from the rotary shaft 123 at a predetermined interval, and in this instance, the frame 122 and the rotary shaft 123 are connected with each other via a connection member 129.

That is, the rotary shaft 123 is eccentrically mounted to one direction without being placed on the same line as the frame 122.

Furthermore, a pair of separate rotary shafts 123 are rotatably mounted on the inner side walls of the air-conditioning case 110. Of course, the rotary shaft 123 may be a single body.

In the meantime, when the door 121 according to the fourth preferred embodiment is mounted on the air-conditioning case 110, as shown in FIGS. 32 and 33, the rotary shaft 1243 is mounted inside the warm air flow passageway P2 and the frame 122 is mounted between an inlet of the cold air flow passageway P1 and an inlet of the warm air flow passageway P2, and in this instance, the connection member 129 connects the rotary shaft 123 and the frame 122 with each other.

Moreover, the connection member 129 is curved in one direction. A pair of the connection members 129 are spaced apart from each other at a predetermined interval to connect the rotary shaft 123 and both end portions of the frame 122 with each other.

Additionally, a reinforcing member 129a is connected between a pair of the connection members 129 to prevent transformation of the frame 122.

In the meantime, in order to prevent transformation of the frame 122, the frame 122 may have a reinforcing rib (not shown) or may be compensatorily formed in advance in consideration of transformation of the frame 122 when it is first manufactured.

As described above, in the door 121 according to the fourth preferred embodiment, both sides of the door 121 can be sealed by means of one thin sheet member 124 joined to one side of the frame 122 since the rotary shaft 123 is spaced apart form the frame 122 at the predetermined interval and the center of the rotary shaft 123 is eccentric without being located on the same line as the frame 122.

That is, when the thin sheet member 124 closes the cold air flow passageway P1 as shown in FIG. 32, the edge portion of one side of the thin sheet member 124 is in elastic contact with the inner wall surface of the inlet of the cold air flow passageway P1 of the air-conditioning case 110 to perform sealing. When the thin sheet member 124 closes the warm air flow passageway P2 as shown in FIG. 33, the edge portion of the other side of the thin sheet member 124 is in elastic contact with the inner wall surface of the inlet of the warm air flow passageway P2 of the air-conditioning case 110 to perform sealing.

Accordingly, the cold air flow passageway P1 and the warm air flow passageway P2 can be all sealed by only one thin sheet member 124.

As described above, the door 121 for the air conditioner in the vehicle according to the present invention can be applied to a door of a type that the frame 122 is formed only on a side of the rotary shaft 123 and a door of a center-pivot type that the frames 122 are formed on both sides of the rotary shaft 123.

Furthermore, the door 121 for the air conditioner in the vehicle according to the present invention can be applied to doors of all kinds, including the temperature-adjusting door 120a, the mode door 120b, an indoor and outdoor air converting door, and so on.

The invention claimed is:

1. A door for an air conditioner in a vehicle, which is rotatably mounted inside an air-conditioning case for adjusting a degree of opening a flow passageway formed inside the air-conditioning case, wherein the door comprises:
a rotary shaft rotatably mounted inside the air-conditioning case;
a frame mounted in such a way as to rotate together with the rotary shaft to adjust a degree of opening the flow passageway; and
a thin sheet member joined to one side of the frame to cover the side of the frame in such a way that an edge portion of the thin sheet member outwardly protrudes more than an end portion of the side of the frame, so that the protruding edge portion is in contact with the air-conditioning case so as to close the flow passageway,
wherein the frame has a second stopper protruding from an end portion of the other side of the frame thereof,
wherein the edge portion of the thin sheet member does not contact the second stopper when the door is open,
wherein the edge portion of the thin sheet member is elastically bent to contact the second stopper and air-conditioning case when the door is closed,
wherein when the door is closed, the second stopper prevents the edge portion of the thin sheet member from being bent excessively.

2. The door according to claim 1, wherein at least one side of the frame is inclined at a predetermined angle.

3. The door according to claim 1, wherein the frame has a projection portion formed on the side thereof to reduce a contact area when it is joined with the thin sheet member.

4. The door according to claim 1, wherein the frame is constructed of a mesh form to reduce its weight.

5. The door according to claim 1, wherein the frame has a plurality of hooks protruding from the side thereof and respectively having retaining jaws, and the thin sheet member has a plurality of coupling holes to be fit to the hooks.

6. The door according to claim 5, wherein the coupling hole has a retaining portion formed in such a way that both sides of the coupling hole are partially cut to be easily joined to the hook and hooked to the retaining jaw.

7. The door according to claim 1, wherein the thin sheet member is bonded to the side of the frame to which the sheet is joined.

8. The door according to claim 1, wherein the frame has a first stopper protruding from one end portion thereof, so that the frame is restrained to the air-conditioning case not to go over the air-conditioning case when the flow passageway is closed.

9. The door according to claim 1, wherein a length L1 of the second stopper protruding from the end portion of the frame is shorter than a length L2 of the thin sheet member protruding from the end portion of the frame.

10. The door according to claim 1, wherein the frame has a baffle protruding from the side thereof to guide a flow of air flowing around the door, and the thin sheet member has a baffle-inserting slit formed at a position corresponding to the baffle for inserting the baffle thereinto.

11. The door according to claim 10, wherein the baffle of the frame has an extension portion formed on a lower portion thereof to be joined around the baffle-inserting slit of the thin sheet member.

12. The door according to claim 11, wherein a contact surface of the extension portion of the baffle and a contact surface formed around the baffle-inserting slit are in face-to-face bonding to prevent an air leakage to the baffle-inserting slit of the thin sheet member.

13. The door according to claim 1, wherein the frame is spaced apart from the rotary shaft at a predetermined interval, and the frame and the rotary shaft are connected with each other via a pair of connection members.

14. The door according to claim 13, wherein a pair of the connection members are disposed to connect both end portions of the frame and the rotary shaft with each other, and a reinforcing member is connected between the connection members to prevent transformation of the frame.

15. The door according to claim 1, wherein the frame has a plurality of fusion pins protruding from the side thereof and the thin sheet member has a plurality of coupling holes for inserting the fusion pins thereinto, so that the thin sheet member and the frame can be joined with each other by fusion.

* * * * *